Oct. 31, 1967 J. P. PRITCHARD, JR 3,350,698

ASSOCIATIVE DATA PROCESSING SYSTEM

Filed March 23, 1965 4 Sheets-Sheet 1

INVENTOR
JOHN P. PRITCHARD, JR.

E. Mickey Hubbard
ATTORNEY

ASSOCIATIVE DATA PROCESSING SYSTEM

Filed March 23, 1965 4 Sheets-Sheet 2

United States Patent Office 3,350,698

Patented Oct. 31, 1967

3,350,698

ASSOCIATIVE DATA PROCESSING SYSTEM

John P. Pritchard, Jr., Richardson, Tex., assignor to Texas Instruments Incorporated, Dallas, Tex., a corporation of Delaware Filed Mar. 23, 1965, Ser. No. 442,029

20 Claims. (Cl. 340—172.5)

ABSTRACT OF THE DISCLOSURE

Disclosed is an associative data processing system which particularly relates to a fully associative memory sytem utilizing cryogenic circuits. The system includes the capability to write in the first empty word, to write in the first word of any selected set, and to selectively write in one or more bit positions of all words and memory or the selected set simultaneously. All words in memory can be cleared simultaneously or a set of words established by prior search can be simultaneously cleared.

The present invention relates generally to data processing, and more particularly relates to a fully associative memory system utilizing cryogenic circuits and to certain sub-combinations thereof.

In an associative memory, a data word may be written or stored at any vacant word position in the memory and no record of the address or geometrical position of the word need be kept for the purpose of subsequent retrieval. The data word is subsequently identified solely by comparing an unmasked portion of its content with a selected norm or argument. In general, all words in the memory have the same number of bit positions, and the corresponding unmasked bit positions of interest in all words, or a selected set of the words, are simultaneously compared with the argument. Thus the memory can be searched parallel-by-word in all searches and parallel-by-bit in some searches so that all words having a predetermined value at the bit positions relative to an argument can be simultaneously identified without first retrieving the word from memory.

As a result of the capability to search parallel-by-word at corresponding bit positions, associative memory systems offer a practical approach to classification of data as to relative magnitude with respect to a norm, i.e., "greater than," "less than," "equal to," and the complements and concatenations thereof, and also on an extremum basis, i.e., relative to an argument or relative to the other words in memory. Although an associative processing system may utilize a wide variety of storage components, and portions of this invention are broadly applicable to systems using any type of logic and storage components, conventional memory components do not offer a very practical approach to construction of such a system because of the large number of components and high power required. Cryogenic memory devices utilizing cycling current stored in a superconductive loop and cryotrons for switching functions provide a realistic basis for such a memory system, and a number of such systems having limited search and retrieval capabilities have been proposed. Cryogenic circuits can be fabricated as thin film miniaturized circuits on substrates which are amenable to operation in a sufficiently cooled ambient to achieve the desired superconductive device performance. But when using such circuit components, it is highly desirable to keep the circuits as simple and compact as possible, consistent with memory and logic capability, so as to preserve substrate space and increase component yield and reliability.

The present invention is concerned with a memory system which has fully associative capabilities, yet which is relatively simple to program, has a high operating speed, and yet has a minimum number of components so as to be compatible with practical circuit technology.

More specifically, the associative memory system in accordance with the present invention has the capability to conduct all magnitude searches, i.e., "equal," "not equal," "greater than," "greater than or equal," "less than," and "less than or equal" with respect to a selected value expressed as an argument. Further, in one embodiment these magnitude searches can be done on all bits of all words simultaneously, i.e., parallel-by-bit as well as parallel-by-word. The system further has the capability of conducting between limits and outside limits magnitude searches.

The system also has the capability to conduct extremum searches such as "greatest" and "least" among a predetermined search set, and therefore "next greater than" and "next less than" a selected argument. This type of search is conducted parallel-by-word, serial-by-bit with, in one embodiment, provision for automatic stepping between bits only where required in order to speed the search.

Further, the system has the capability to write in the first empty word, to write in the first word of any selected set, and to selectively write in one or more bit positions of all words in memory or of a selected set simultaneously. All words in memory can be cleared simultaneously or a set of words established by prior search can be simultaneously cleared.

An identified set of words may be read out serially based on the relative physical positions of the words in the memory, or may be read out either in an ascending or a descending order with respect to their whole or partial contents in a minimum lapsed time. Further, if in the course of reading out words in an ascending or descending order two or more words are tied based on the first ordering criteria, this subset of words may also be read out either serially by memory position or in an ascending or descending order based on a second ordering criteria.

Provision is also made to take action, i.e., read or write, either serial-by-word or parallel-by-word, and to take such action without losing identity of the original set or without destroying the stored data. Yet a destructive readout is selectively available.

The invention also contemplates many other more specific aspects which will be described in detail in the following specification and appended drawings and which will be more specifically pointed out in the appended claims which are intended to constitute the sole limitations upon the scope of this invention. In the drawings:

Figure 1:
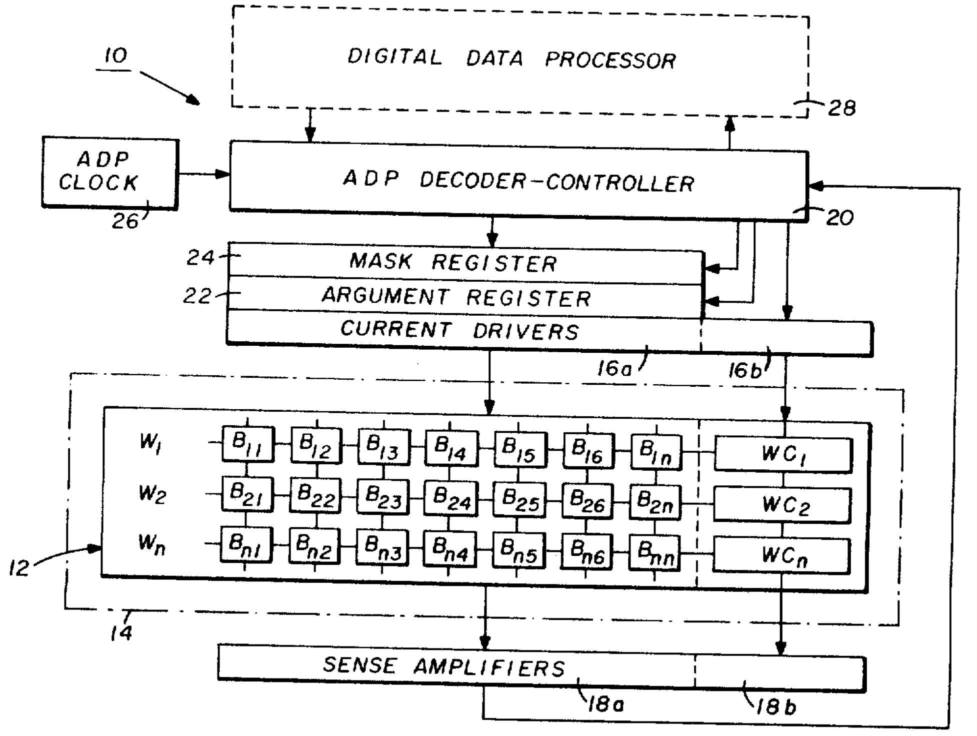
FIGURE 1 is a block diagram of an associative memory system in accordance with the present invention.
Figure 6:
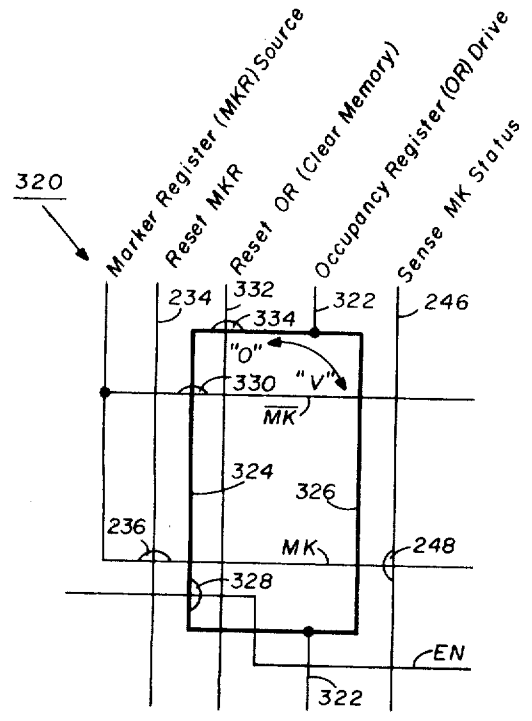
Figure 5:
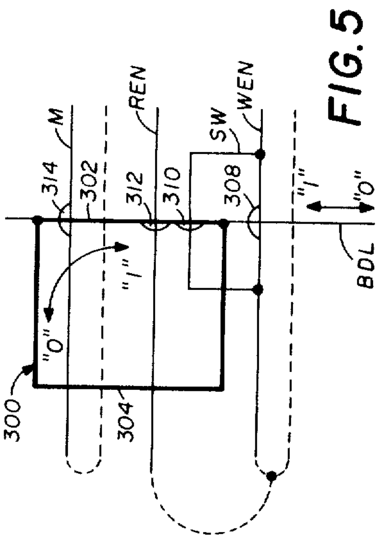
Figure 4:
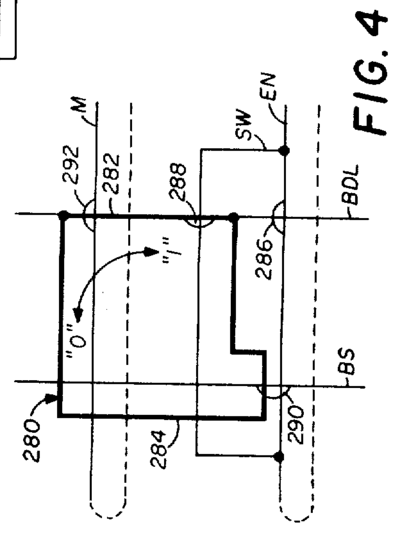
Figure 3A:
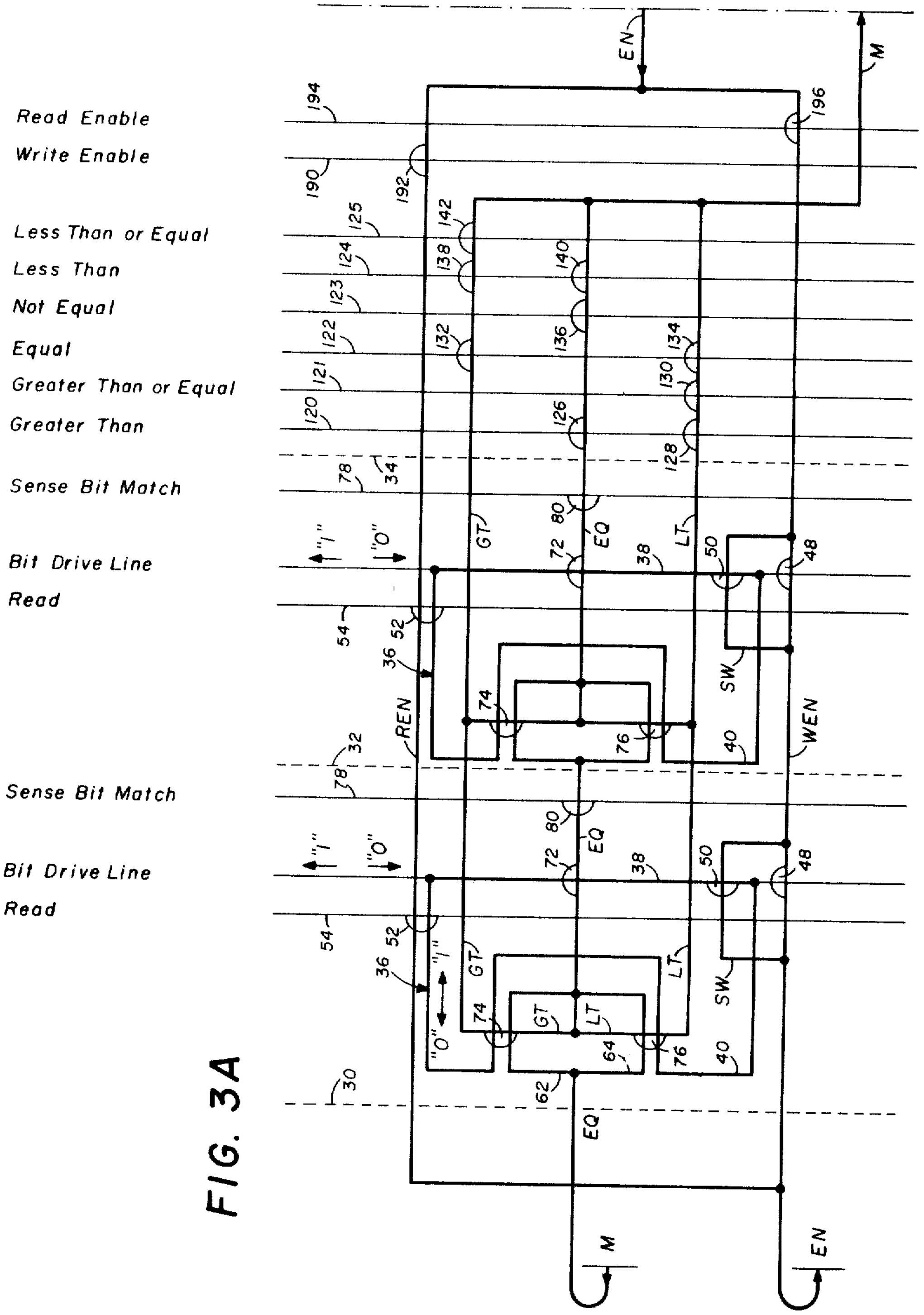
Figure 3B:
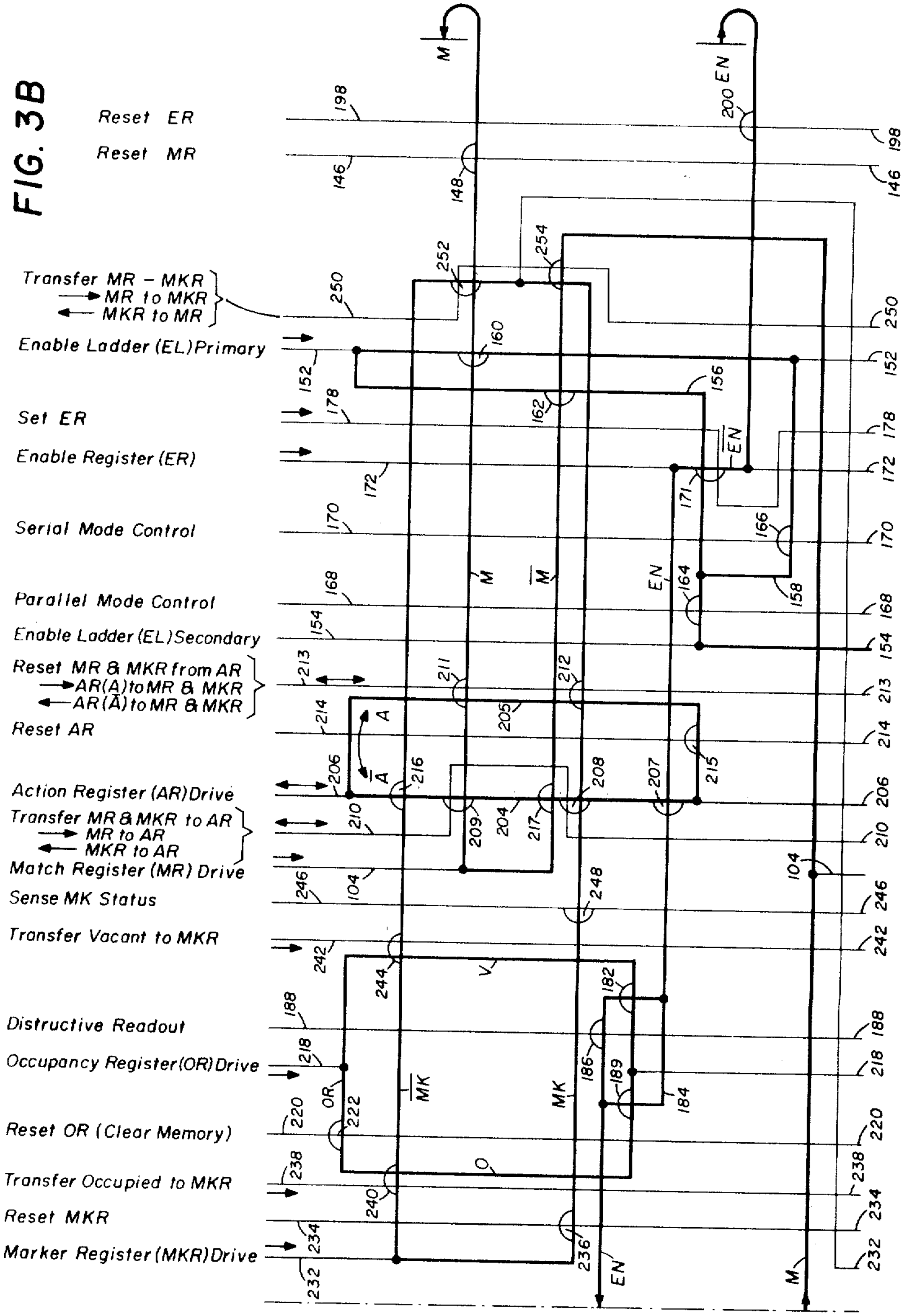

FIGURES 3A and 3B, collectively, are schematic circuit diagrams of a memory word, including the word control, for an associative memory system constructed in accordance with the present invention;

FIGURE 4 is a schematic circuit diagram illustrating an alternative memory bit which may be used in the memory word circuitry of FIGURES 3A and 3B;

FIGURE 5 is a schematic diagram of another memory bit position which may be used in the memory word of FIGURES 3A and 3B; and FIGURE 6 is a schematic diagram of still another bit position which may be used in the system of FIGURE 1.

Referring now to the drawings, and in particular to FIGURE 1, a typical associative memory system is indicated generally by the reference numeral 10. The memory portion of the system is indicated generally by the reference numeral 12 and in a preferred embodiment is comprised of cryogenic circuits located within a cryogenic environment indicated by the dotted line 14. The memory 12 is comprised of a large number of memory words represented as $W_1$, $W_2$ and $W_n$ which, as illustrated, are oriented in the horizontal direction. Each word is comprised of a number of memory bit positions B and a word control WC. The first subscript designates the geometrical ordering of words in memory from first to last and the second subscript designates the bit positions from high to low order. The total number of memory words is as great as feasible or desired, whichever is the limiting factor. However, the organization and operational control of the associative memory is insensitive to the number of words in memory. Each word has a corresponding number of bit positions, the total number again being as great as practical or as required. For example, a very useful memory system might have $10^7$ words, each comprised of ninety-eight bits. In general, the corresponding bit positions, $B_{11}$ $B_{21}$ . . . $B_{n1}$, for example, of all words in memory are controlled by conductors extending from a bank of current drivers 16*a* through the corresponding bit positions of all of the words to a bank of sense amplifiers 18*a*. Selected words in the memory may be written into, read out, or searched as a result of the word control circuits WC associated with each word. All word control circuits are controlled by conductors extending from the current driver bank 16*b* through all the word controls to the sense amplifier bank 18*b*.

The word controls may be operated directly from an Associative Data Processor (ADP) decorder and controller 20, while the current drivers for the several bits are controlled both by an argument register 22 and a mask register 24, which in turn are controlled by the ADP decoder-controller. The ADP decoder-controller may be synchronized by the ADP clock 26 to process instructions from a conventional digital data processor 28. The outputs from the sense amplifiers 18*a* and 18*b* are fed back to the ADP decoder-controller 20 for further action on instructions from the processor 28. In general, the present invention is primarily concerned with the memory portion 12. The room temperature equipment including the current drivers and sense amplifiers may comprise any suitable conventional electronic and logic systems for carrying out the controller functions required to operate the memory portion 12 as will now be described in detail.

FIGURES 3A–3B illustrate a preferred cryogenic embodiment of an entire word, word $W_2$ for example, of the memory system 12. The bit position $B_{21}$ would correspond to that portion of the circuit between dotted lines 30 and 32, and bit $B_{22}$ would be that portion between dotted lines 32 and 34. The word control circuit may be considered as that portion to the right of dotted line 34 in FIGURE 3A, all of FIGURE 3B, and that portion to the left of dotted line 30 in FIGURE 3A. The bit positions $B_{23}$ through $B_{2n}$ would be repetitions of bit positions $B_{21}$ and $B_{22}$ and accordingly, corresponding components of each bit position will be designated by corresponding reference numerals. As used in this specification, the highest order bit position is $B_{21}$ and the lowest order bit position is $B_{2n}$, and word $W_1$ is the first word in memory and word $W_n$ the last. All conductors within the memory 12 are superconducting in the cryogenic environment except for the gates of the various cryotrons when these gates are switched resistive by current in an overshadowing control conductor in the conventional manner. The fabrication and operation of cryotrons is known in the art and will therefore not be discussed in detail herein.

MEMORY BITS OF FIGURES 3A–3B

Each memory bit is comprised of a storage loop 36 formed by branches 38 and 40 at each word in a bit drive line BDL which extends through corresponding bit positions of all the words in the memory system. A write enable line WEN extends through each bit position of a word has a selective write enable branch SW at each bit position which extends over branch 38 of the storage loop 36 and has a relatively high inductance compared to the parallel portion of line WEN so that a major portion of the current prefers to stay in line WEN. A cryotron 48 in the write enable line WEN is switched resistive by a current in the bit drive line BDL to switch all current into the selective write enable branch SW. A cryotron 50 in the branch 38 of the storage loop 36 is switched resistive only when all current from the write enable line WEN is in the selective write enable branch SW.

When both cryotrons 48 and 50 are superconductive, a major portion of the current will stay in line WEN because of the higher inductance of branch SW and the portion of the current through the branch SW is insufficient to switch cryotron 50 resistive. Therefore, when no current is flowing in the bit drive line BDL, the cryotrons 48 and 50 are both superconductive, even though current may be passing through the write enable line WEN. However, when current is passed through the bit drive line BDL in either direction, cryotron 48 is switched resistive and all of the current in the write enable line WEN passes through the branch SW thereby switching cryotron 50 resistive. As a result, all of the current through the bit drive line BDL is switched through the branch 40 of the storage loop 36. The current through the write enable line WEN is then terminated to switch the cryotron 50 back superconductive. After the cryotron 50 is superconductive, the current through the bit drive line BDL is terminated so that a cycling current is trapped in the storage loop 36. The direction of the current in the storage loop 36 indicates the logical state of the bit. In this disclosure, current in the clockwise direction is arbitrarily assumed to be logical "1" and current in the counterclockwise direction logical "0".

SELECTIVE WRITE IN BIT POSITIONS

In order to store or write a logical "0", current is passed downwardly through the bit drive line BDL and, provided there is enabling current in the selective write branch SW, the current passes downwardly through the branch 40 of the storage loop 36. Then when the write enable current and bit drive line current are terminated, in that order, a counterclockwise current is trapped in the storage loop 36 to store a logical "0". In order to write a logical "1", current is passed upwardly through the bit drive line BDL, and the same procedure followed to trap a cycling current in the clockwise direction. It should be noted that the write enable current in line WEN must be terminated first so that cryotron 50 will be superconducting before termination of the current through the bit drive line BDL. If the bit write current through line BDL is terminated first, no current will be trapped in the storage loop 36. This latter procedure may be used to actually clear the memory of any trapped currents in the storage loops, although such action is not required for normal operating procedure as will hereafter be described in greater detail.

BIT READOUT

The binary number stored in the loop 36 is sensed and therefore "read out" by a cryotron 52 located in a bit sense line 54 which extends through the corresponding bit position of all words in memory. Cryotron 52 has a dual control including a read enable line REN which extends through all of the bit positions of the word and the branch 40 of the storage loop 36. The cryotron 52 is designed such that if the direction of the current through the branch 40 and through the read enable line REN are opposed, the cryotron 52 will remain superconductive. If, however, the currents are in the same direction, then the cryotron 52 is switched resistive. Thus, assuming that current in the read enable line REN is always from right to left, the cryotron 52 will be superconductive when a logical "1" is stored in the loop 36, and will be resistive when a logical "0" is stored in the loop. Only one word at a time can be read out, as will hereafter be described, so that the logical state of the storage loop 36 is determined by the presence of absence of a voltage drop in the bit sense line 54 as determined by the corresponding sense amplifier in the bank 18*a*.

BIT INTERROGATION FOR MAGNITUDE SEARCHES

An "equals" branch EQ is connected to a match line M of a match register, which will hereafter be described in detail, at the highest order bit position of each word and is split into control branches 62 and 64 at each bit position, which are rejoined to continue to the next bit position. A "greater than" branch GT and a "less than" branch LT split off from the "equals" branch EQ at each bit position and extend to the end of the word. A cryotron 72 in the "equals" branch EQ is controlled by current through the branch 38 of the storage loop 36. A cryotron 74 disposed in the "greater than" branch GT is controlled by current in the control branch 62 and current in branch 40 of the storage loop 36. Similarly, a cryotron 76 in the "less than" branch LT is controlled by current in the control branch 64 and in the branch 40 of the storage loop. The inductances of the control branches 62 and 64 are substantially equal so that current will be substantially equally divided between the two branches.

Mask status information is conveyed to the bits by the presence or absence of current in the bit drive line BDL. If current is present in either direction, the bit is unmasked and is taken into account in the search. If no current is present in the bit drive line BDL during interrogation, then the bit position does not enter into the determination of word match status. If current through the bit drive line BDL is directed upwardly, a logical "1" is asked, and it directed downwardly, a logical "0" is asked. The current in the bit drive line BDL splits between the branches 38 and 40 of the storage loop 36 and adds with the stored current in one branch and opposes the stored current in the other branch. Cryotron 72 is designed such that if the argument current and stored currents oppose, the cryotron remains superconductive, but if the two currents add, cryotron 72 is switched resistive. Cryotron 72 remains superconductive in the presence of only a stored current. Cryotrons 74 and 76 are designed so as to remain resistive at all times during interrogation except when the current stored in the loop opposes both the current in the corresponding control branch 62 or 64 and the argument current in branch 40. The various branches may be so designed that argument current through branch 40 of the storage loop is approximately equal to the current through each of the control branches 62 and 64, and the cycling current stored in the loop is approximately equal to the sum of these two currents.

When the logic value of the argument matches the logic value stored in the loop, the current stored in the loop will oppose the argument current in the branch 38 and the cryotron 72 will be superconductive. However, cryotrons 74 and 76 will remain resistive because the stored current and the argument current are in the same direction in branch 40. This total current adds with the current in one of the branches 62 or 64 and bucks the current in the other branch, but is sufficient when bucking the current in one of the branches to nevertheless switch that cryotron resistive. As a result, current recombining from lines 62 and 64 can continue to the next bit position of the word only through the "equals" branch EQ.

When the logic value of the stored current does not match the logic value of the argument current, the two currents will add in the branch 38 and the cryotron 72 will be switched resistive. On the other hand, the stored current and the argument current will be in opposite directions in the branch 40. If a logical "1" is stored in the loop 36 and the argument is a logical "0", cryotron 74 will be superconductive because the argument current adds with the current in control branch 62 to cancel out the stored current. However, cryotron 76 remains resistive because the argument current and the current in control branch 64 cancel out, leaving the stored current to switch the cryotron resistive. Thus when the stored number is higher than the argument number, current will be switched from the "equals" branch EQ to the "greater than" branch GT at the highest bit position and the current will bypass the remaining lower order bit positions of the word. If a logical "0" is stored and the argument is a logical "1", cryotrons 72 and 74 will be resistive and cryotron 76 superconductive so that the current will be shunted into the "less than" branch LT, because the argument current adds with the current in control branch 64 to cancel out the stored current. Thus it will be noted that as long as the stored number at each bit position matches, i.e., is equal to, the argument number, current remains in the "equals" branch EQ so that the next lower order bit position will be considered. However as soon as a determination of "greater than" or "less than" is made, the lower order bit positions are not considered. The relationship of the word to the argument is then determined by the location of the current after the lowest order bit position.

BIT INTERROGATION FOR EXTREMUM SEARCHES

In conducting extremum searches, it is necessary to know whether there are no words in the search set which match the argument at a particular bit position, or whether there is at least one word in memory which matches the argument. This is preferably accomplished by a bit match sense line 78 extending through the corresponding bit position of all words in memory and having a cryotron 80 which is switched resistive by current in the "equals" branch EQ at each bit position. All bit positions relevant to a particular search can then be unmasked and interrogated simultaneously with the argument. Then beginning at the highest order bit position, the argument is successively changed at each bit position where the bit sense line is superconductive, which indicates that no words in the search set match the argument at that bit position and that this bit position is not determinative. The argument bits may be initially assumed all logical "1" for a maximum search. Proceeding from high to low order bit position, those argument bits for which the sense bit match line is superconductive are converted to logical "0", thus identifying the word or words which possess the maximum value by current exiting the lowest order bit position on the "equals" line EQ. The minimum word or words of a set are determined in the same manner except that the argument may be initially assumed a logical "0" at each bit position of interest, and the argument is changed to logical "1" at the bit positions where the sense bit match line is superconductive, again working from high to low order. The words in which the current is still in the "equals" branch after all bit sense lines are resistive are the minimum of the search set. It will be noted that by providing a bit match sense line 78 at each bit position, a separate interrogation of the bits is required only for each bit sense line that is superconductive. If desired, a single bit match sense line can be used, in which case the relevant bit positions would be unmasked and interrogated one at a time, i.e., serially, from higher order to lower order and the argument at each bit position changed if the bit match sense line remained superconductive.

WORD CONTROL CIRCUIT OF FIGURE 2

Figure 2:
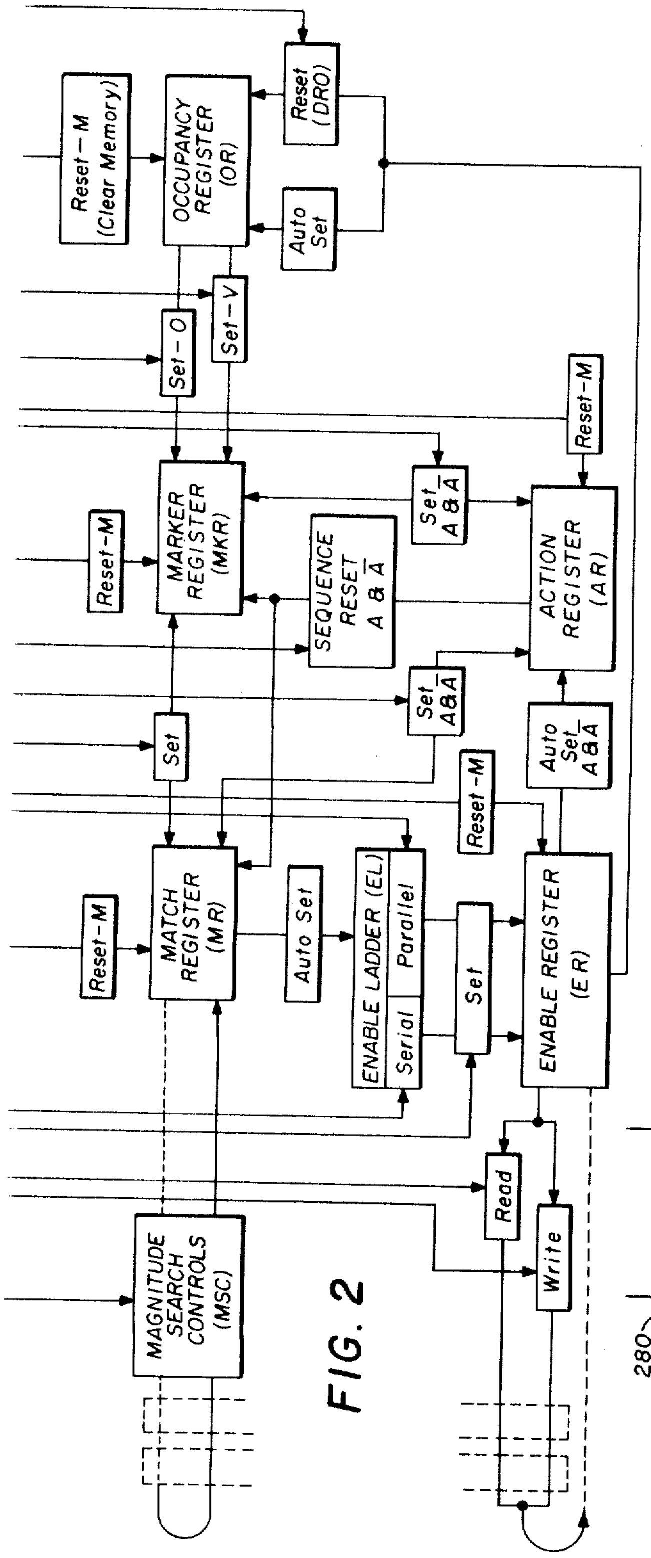
FIGURE 2 is a schematic block diagram of a word control circuit in accordance with this invention.

A word control circuit constructed in accordance with this invention is illustrated in the block diagram of FIGURE 2. A match register MR, marker register MKR, occupancy register OR and enable register ER are each comprised of a binary storage device at each word position for storing binary information relative to each word. Each of these registers has a "true" state and a "$\overline{\text{true}}$" state. The match register MR has M and $\overline{M}$ states, the marker register MKR has MK and $\overline{MK}$ states, the enable ladder register EL has EL and $\overline{EL}$ states, the enable register ER has EN and $\overline{EN}$ states, and the occupancy register OR has O and V states to indicated word occupied or vacant, respectively.

As used herein, the "true" state will be used to identify a word or set of words which is to be processed in some manner or merely held for future processing. The term "reset" means switching all of the binary devices of a particular register to the "$\overline{\text{true}}$" state, and "set" means switching the register from the "$\overline{\text{true}}$" state to the "true" state at the word positions defined by the "true" state of another register. Thus when a first register is set from a second register, the set of words identified in the second register, usually by the "true" condition, is added to the set of words already identified in the first register by the "true" state. A simple transfer between the two registers can be accomplished by first resetting the register which is to be set to the other register.

An action register AR is also provided which has a ternary storage capability, the three states of which will be referred to as the "0" state, to which the register is reset, the $\overline{A}$ state which is used to identify a set of words upon which action is to be taken, but upon which action has not been taken, and the A state which is used to identify the word or words upon which action has been taken.

Each of the registers may be selectively reset to the "$\overline{\text{true}}$" or logical "0" state by a control extending outside the memory system as represented by the "reset-M" control lines. The "true" state of the match register MR at each word automatically results in the interrogation strobe current through the match branch M of the word. When the match register MR is in the "$\overline{\text{true}}$" state, no interrogation of the word is conducted. The "true" state of the match register MR provides the final definition of the set of words to be interrogated or acted upon, and reflects the results of the search after the search procedure has been completed.

The marker register MKR serves as a backup for the match register MR to preserve the identity of any set of words such as the initial search set which is lost during the search because the match register is reset during the search procedure where the word does not match the argument. The match register MR can be selectively set to the marker register MKR, and the marker register MKR can be selectively set to the match register MR to permit the selective transfer of sets of word identifiers on an accumulative basis, or after resetting the transferee register, on a simple shift basis in either direction between the two registers as represented by the line with oppositely directed arrows.

The match register MR automatically sets an enable ladder EL in a manner dependent upon whether the enable ladder is in the serial or parallel mode of operation. If the enable ladder EL is selectively placed in the serial mode of operation, the match register MR automatically sets the enable ladder to EL only in the first word identified by the "M" state of the match register. If the enable ladder EL is placed in the parallel mode of operation, the enable ladder EL is automatically set to the EL state at all words identified by the "M" state in the match register MR.

The enable register ER is selectively set from the enable ladder to selectively initiate the EN current; and by reason of the serial and parallel modes of operation of the enable ladder EL, may be selectively set only to the first word identified by the "M" state of the match register MR, or to all words identified in the match register. Where the enable register ER is in the EN state, current is automatically directed through either the read enable or write enable lines, as selected.

The $\overline{A}$ state of the action register AR is used to preserve the identity of the words upon which action is to be taken and the A state is used to preserve the identity of words upon which action has been taken, and is also used to reset the marker register after action has been taken to accomplish sequential or serial operation. Accordingly, the A state of the action register AR is used to selectively reset the marker register MKR and the match register MR to the $\overline{M}$ and $\overline{MK}$ states in order to provide a controlled sequencing during the serial mode of operation. Thus when the enable ladder EL is operated in the serial mode, the enable register ER is set only to the first word identified in the match register MR. When the desired action is accomplished on the single word so enabled, the action register AR is set in the A state, and the A state is then selectively used to reset the match register MR and the marker register MKR so that the enable ladder EL is automatically reset from the word acted upon and set to the next successive word identified in the match register MR. Action can then be taken on this word by setting the enable register ER from the enable ladder EL and the procedure repeated until all words in the set identified in the match register MR have been acted on. Thus it will be seen that all words identified in the match register can be acted upon serially by merely placing the enable ladder EL in the serial mode of operation, setting the enable register to the enable ladder, carrying out the desired action, and then resetting the match register from the action register. After the set of words has been acted upon, the action register AR may be used to reconstruct the action set in the marker register MKR by setting the marker register to the action register. This set can then, of course, be transferred to the match register MR for further action as desired.

The occupancy register OR is used to identify the words in memory which contain information for future consideration. The entire memory can be cleared by resetting the occupancy register OR to "vacant." The stored information need not be actually erased because it does not interfere with subsequent writing in the word or with search of other words. The occupancy register OR is automatically set to "occupied" status by action of the enable register ER because it is assumed that action will be taken only on words which are either occupied or in which information is then being written. The occupancy register OR may be selectively reset from the enable register ER as a word is being read for the last time, and in effect provides a destructive readout although the information may still be stored in the word. The operation of the word control circuit of FIGURE 2 will hereafter be described in greater detail.

WORD CONTROL CIRCUIT—FIGURES 3A–3B

A cryogenic implementation of the control circuit illustrated in FIGURE 2 is illustrated in FIGURES 3A and 3B. However, it is to be understood that the control circuit illustrated in FIGURE 2 may be implemented using other types of storage elements and control components without departing from the broader aspects of the invention.

The match register MR is comprised of a match branch M and a not match branch $\overline{M}$ formed in a match register drive line 104 at each word in memory. The match branch M extends under the right-hand edge of the ground plane for the circuit and exits at the opposite edge where it is connected directly to the "equals" branch EQ of the highest order bit position. The "equals," "greater than" and "less than" branches EQ, GT and LT then form alternative, parallel match branches M through the bit positions and are finally rejoined and returned as a single line to reconnect to the drive line for the succeeding words in memory. As previously described, the M branch current remains in the "equals" branch EQ through each successive bit position where the logic value stored matches the logic value of the argument. Thus if all of the bit positions match the argument, the current will exit at the right-hand end of the word in branch EQ. However, if the logic number stored at any one bit position is different from the argument at that bit position, then the M branch current in the EQ branch will be diverted into either the "greater than" or "less than" branches GT or LT and will continue through the word in that branch without recourse to the "equals" branch EQ.

Six magnitude control lines 120–125 permit the selection of the desired magnitude search to be conducted. A "greater than" control line 120 controls cryotrons 126 and 128 in the EQ and LT branches. Thus a current through line 120 leaves a superconductive path only through the "greater than" branch GT, so that unless there is a mismatch favoring "greater than" at the first mismatched bit position, the match branch M will be resistive and indicate a not match condition for the word. A "greater than or equal to" line 121 controls a cryotron 130 in branch LT so that both branches EQ and GT remain superconductive. Similarly, an "equals" control line 122 controls cryotrons 132 and 134 in branches GT and LT so that a match condition can exit only in the "equals" branch EQ. Current in a "not equals" control line 123 switches a cryotron 136 in branch EQ resistive so that a match condition can be satisfied only if current is in either branches GT or LT. Current in a "less than" control line 124 switches cryotrons 138 and 140 in branches GT and EQ resistive so that only branch LT provides a superconductive path for the match branch M of the match register MR. Current in an "equals to or less than" control line 125 switches a cryotron 142 in branch GT resistive so as to leave only branches EQ and LT superconductive.

The match register MR is reset by pulsing a reset match register line 146 which extends through all words in memory and switches a cryotron 148 in each match branch M resistive. It is necessary to positively reset the match register MR in order to insure that all current is in the proper branch at the start of a search operation, it being realized that once current is established in a superconductive path it tends to stay in that path until the path switches resistive, and also to remove any previously identified words from the register.

The enable ladder EL is comprised of primary and secondary conductors 152 and 154 which extend through all words in memory and a crossover branch 156 at each word which interconnects the primary and secondary conductors. A return branch 158 interconnects a midpoint of each crossover branch 156 and the primary conductor 152 below a cryotron 160 in the primary conductor at each word position. The cryotron 160 is controlled by current in the match branch M of the match register MR. A cryotron 162 in the crossover branch 156 is controlled by current in the not match branch $\overline{M}$ of the match register MR. Thus, if current is in the not match branch $\overline{M}$ of the particular word, cryotron 162 is resistive and cryotron 160 is superconductive so that current in the primary conductor 152 of the ladder passes through that word control without any effect on the word. However, if current is in the match branch M, then cryotron 160 is switched resistive and cryotron 162 is superconductive so that incident current is directed through the crossover branch 156.

Parallel-by-word and serial-by-word modes of operation are accomplished by cryotrons 164 and 166 disposed in the crossover branch 156 and the return branch 158, respectively, which are switched resistive by current in parallel and serial mode control lines 168 and 170, respectively, which extend through all words in memory. The parallel and serial mode control lines are always alternatively energized during an action phase such that one and only one of the cryotrons 164 or 166 will be superconductive and one resistive. Thus when the parallel mode control line 168 is active, cryotron 164 will be resistive and current in the crossover branch 156 will be directed back to the primary line 152 through the return branch 158 after having passed through the cryotron 171, which will presently be described. The current will then continue down the primary conductor 152 to actuate each subsequent crossover branch where current is in the match branch M of the match register MR. If the serial mode control line 170 is energized, current is shunted to the enable ladder secondary 154 and will not act upon any subsequent word in the memory. Thus it will be noted that the enable ladder forms either one large register active only at the first word in the memory identified by current in the match branch M of the match register MR, or when operated in the parallel mode, forms a binary cell at each word position which is set to the match register MR. Thus it will be noted that the enable ladder is automatically set to the match register MR in a manner depending upon the mode controls.

The enable register ER is formed from an enable register drive line 172 which is divided at each word position into a "not enbale" branch $\overline{EN}$ in which the cryotron 171 is formed, and an enable branch EN which extends from the left-hand side of FIGURE 3B to the right-hand side of FIGURE 3A where it divides into the write enable line WEN and read enable line REN. The read and write enable lines REN and WEN pass through each bit position and rejoin at the left-hand edge of FIGURE 3A as the enable branch EN which then passes under the substrate and emerges at the right-hand side of FIGURE 3B and joins the "not enable" branch $\overline{EN}$ to reform the enable drive line which extends through the succeeding words in memory. The cryotron 171 is so designed as to be switched resistive only by current in the branch 156 and current in a set enable line 178. Therefore the enable register is selectively set to the enable ladder by pulsing the enable register set line 178.

The current through the enable branch EN switches a cryotron 207 to automatically set the action register AR as will presently be described, then passes over the gate of a cryotron 182 to automatically set the occupancy register OR to "occupied." A destructive readout branch 184 of the enable branch EN is designed to have a relatively high inductance as compared to the parallel portion of the enable branch EN so that current will normally prefer to remain in the enable branch EN and pass through the gate of cryotron 186. However, when cryotron 186 is switched resistive by current in the destructive readout control line 188, the current through cryotron 186 will be shifted to the destructive readout branch 184 and switch the cryotron 189 resistive, thus resetting the occupancy register OR to "vacant" to provide a destructive readout.

Current in the enable branch EN then passes through either the write enable line WEN or the read enable line REN, depending upon whether the system is operating in "read' or "write" mode. Current in a write enable control line 190 switches cryotron 192 in the read enable line REN resistive to direct current through the write enable line WEN. Current in a read enable control line 194 switches cryotron 196 in the write enable line WEN resistive to direct the enable current through the read enable line REN. The currents in the read and write enable lines coact with the several bit positions of the word as heretofore described. The enable register ER is reset to switch current from branch EN to branch $\overline{EN}$ by pulsing a reset control line 198 which switches a cryotron 200 in each enable branch EN resistive. A positive reset is required because once current is established in the superconductive enable branch, current will remain in the branch until the branch is switched resistive.

The occupancy register OR is comprised of a vacancy branch V and an occupancy branch O formed at each word position in an occupancy register drive line 218 which extends through all words in memory. The occupancy register OR can be reset from "occupied" to "vacant" by pulsing a reset line 220 which extends through all words in memory and switches a cryotron 222 in the occupancy branch O at each word resistive to shift the current to the vacancy branch V. It should be noted that the cryotron 182 previously described in connection with the enable register ER is in the vacancy branch V so that current through the enable branch EN of the enable register ER automatically sets the occupancy register from "vacant" to "occupied," since it is assumed that the word is either being written into or is already occupied. A destructive readout is provided merely by pulsing line 188 to switch cryotron 186 resistive and shift current in the EN branch to branch 184. This switches cryotron 189 in the occupancy branch O resistive so as to reset the occupancy register to "vacant."

The marker register MKR is comprised of mark branch MK and not mark branch $\overline{MK}$ formed at each word position in a marker register drive line 232 which extends through all words in memory. The marker register MKR can be reset to the not mark branch $\overline{MK}$ by pulsing a reset marker register control line 234 which switches a cryotron 236 in each mark branch MK resistive to steer the drive line current through the not mark branch MK.

The marker register MKR may be selectively set to the "occupied" status of the occupancy register OR by pulsing a set marker register to occupied register control line 238 which, in conjunction with current in the occupancy branch O, switches cryotron 240 in branch MK resistive to switch the current of the drive line 232 to branch MK. Similarly, the information in the vacancy branch V may be transferred to the marker register MKR by pulsing a set marker register to vacant control line 242 which, in conjunction with current in the vacancy branch V, switches cryotron 244 in branch $\overline{MK}$ resistive to switch the marker register drive line current to branch MK.

A marker sense line 246 extends through all words in memory and has a cryotron 248 at each word position which is switched resistive by current in the mark branch MK. If the sense line 246 is superconductive, it indicates that there are no words at which the marker register MKR is set in the mark branch MK. Conversely, if the marker sense line is not superconductive, it indicates that the marker register MKR is set to mark branch in at least one word in memory.

The marker register MKR can be set to the match register MR, or the match register MR set to the marker register MKR, by pulsing the MR–MKR transfer line 250 with a current of the appropriate polarity. A cryotron 252 in the not mark branch $\overline{MK}$ is switched resistive only when current in the control line 250 adds to current in the match branch M, but remains superconductive otherwise. Similarly, cryotron 254 in the not match branch $\overline{M}$ is switched resistive if the current in the control line 250 adds with current in the mark branch MK, but is superconductive in all other cases. Thus when the current is passing upwardly through the control line 250, cryotron 254 will be resistive and cryotron 252 superconductive so that the match register MR will be switched from branch $\overline{M}$ to branch M at those words where current is in the mark branch MK of the marker register MKR. In other words, the match register is set to the marker register accumulatively. Conversely, when current is passed downwardly through the control line 250, cryotron 252 will be switched resistive and cryotron 254 will remain superconductive, so that current in the $\overline{MK}$ branch of the marker register MKR will be shifted to the MK branch at words where current is in the match branch M of the match register MR. In other words, the marker register is set to the match register.

The action register AR is comprised of branches 204 and 205 formed at each word position in an action drive line 206 which extends through all words in memory. Cryotron 207 in branch 204 is switched resistive by current in the enable branch EN so that current when present through the drive line 206 will be diverted through branch 205. Then when the enable register is reset, and current terminated in the drive line 206, a cycling current will be stored in the loop comprised of branches 204 and 205 in a direction determined by the direction of current through the drive line 206. As used herein, current directed downwardly through line 206 results in a clockwise current which is representative of the A state indicating that action has been taken. Current upwardly through line 205 results in counterclockwise current being trapped in the loop formed by branches 204 and 205 which is representative of the $\overline{A}$ state indicating that action is to be taken, but has not yet been taken. The absence of cycling current in the loop is indicative of the "0" state.

The action register AR can be selectively set to either the match register MR or the marker register MKR by pulsing a transfer control line 210 in an appropriate direction. For example, the action register AR can be set to the match register MR by passing current downwardly through transfer control line 210 so that currents in the transducer control line and in the match branch M will be in the same direction and will switch cryotron 209 resistive. Cryotron 208 will remain superconductive because current in the transfer line 210 and in the MK branch of the marker register are in opposition. The action register AR can be selectively set to the marker register MKR by an upwardly directed current in the transfer control line 210 so that current in the transfer control line and current in the MK branch of the marker register MKR will add to switch cryotron 208 resistive. Thus the switching of cryotron 208 or 209 resistive permits the writing of current in the loop formed by branches 204 and 205 in either direction depending upon the direction of current through the action drive line 206, so that the action register AR can be set, in either the A or $\overline{A}$ states, to either the match register MR or the marker register MKR.

The match register MR and marker register MKR can be set to either the A or $\overline{A}$ state of the action register AR by means of cryotrons 216 and 217 in the $\overline{MK}$ and the $\overline{M}$ branches, respectively, by a current in the proper direction in the action drive line 206. For example, if the marker register and match register are to be set to the $\overline{A}$ state of the action register, current is passed downwardly through the drive line 206 so that the currents will add and switch cryotrons 216 and 217 resistive. At those word positions where the current stored in the action register represents the A state, the cryotrons 216 and 217 will remain superconductive because the currents will be in opposition at words in which the AR is in the "0" state, control current is insufficient to switch cryotrons 216 and 217 resistive by design. If the match and marker registers MR and MKR are to be set to the A state, current is passed upwardly through drive line 206.

Conversely, the match register MR and marker register MKR can be reset to either the A or $\overline{A}$ state of the action register, i.e., the MR and MKR registers reset to the "$\overline{\text{true}}$" branches at the words identified by either the A or $\overline{A}$ states, selectively, by means of cryotrons 211 and 212 in the M branch and MK branch of the match register MR and marker register MKR, respectively. For example, assume that the match and marker registers MR and MKR are to be reset to the A state of the action register AR. Current would then be directed downwardly through sequence control line 213 so that currents in the branch 205 and in the sequence control line 213 would add and switch cryotrons 211 and 212 resistive, thereby resetting both registers at that word. If the match and marker registers MR and MKR are to be reset to the $\overline{A}$ state of the action register AR, then current is directed upwardly through sequence control line 213 so as to add with current in the branch 205 and switch cryotrons 211 and 212 resistive. Of course, in those words where current in branch 205 opposes the current in sequence control line 213, or where no current is in branch 205 at all, cryotrons 211 and 212 remain superconductive so that the match and marker registers MR and MKR are not affected at those word positions. The action register AR may be reset to the "0" state by pulsing reset control line 214 to switch cryotron 215 in the branch 205 resistive.

OPERATION SUMMARY OF WORD CONTROL OF FIGURES 3A–3B

The words identified as "occupied" in the occupancy register OR may be transferred to the marker register by pulsing line 238 to switch the cryotrons 240 resistive, or the words identified as "vacant" may be shifted to the marker register MKR by pulsing line 242 to switch the cryotrons 244 resistive.

The set of words identified by current in the MK branches of the marker register MKR can be set into the corresponding M branches of the match register MR by pulsing line 250 in the direction necessary to switch the cryotrons 254 resistive. Conversely, the words identified in the match register MR can be set into the marker register MKR by reversing the current in line 250 to switch cryotrons 252 resistive. Thus the information in the "true" branches of the match register and the marker register can be interchanged at will.

The match register MR automatically sets the enable ladder EL by switching cryotron 160 resistive. The mode of operation of the enable ladder is selected by a current driven through either the parallel-by-word mode control line 168 or the serial-by-word mode control line 170. If the parallel-by-word mode control line is active, cryotron 164 is resistive so that current is shunted back through the return branch 158. Current will then be in the crossover branch 156 at all words in the set identified by current in the M branch of the match register MR. If, however, the current is in the serial-by-word mode control line 170, cryotron 166 is resistive so that current is switched to the enable ladder secondary 154 only at the first word of the set identified in the match register. Thus for serial-by-word mode, the enable register ER is set to the enable ladder EL by pulsing line 178 to switch cryotron 171 resistive, and only the first word in the set is enabled. The action register AR is automatically set to the enable register ER as a result of current in branch EN which switches cryotron 207 resistive in appropriate timing relationship to downward current through drive line 206 to result in trapping of a current corresponding to A.

The action register AR may be automatically set either to the A or $\bar{A}$ state as a result of current in the enable branch of the enable register, and can be set in either the A or $\bar{A}$ state from either the match register MR or the marker register MKR. Further, the match register MR and marker register MKR can be reset from either the A or $\bar{A}$ state of the action register.

As will hereafter be described in greater detail, sequential action on words identified by the match register is effected when the enable ladder is in the serial-by-word mode of operation by resetting the marker register MKR and match register MR from the A state of the action register after action is taken on each word. This is accomplished by a downward current in line 213 which will switch cryotrons 211 and 212 resistive in those words for which A is "true." The words acted upon, i.e., identified by state A, or not yet acted upon, i.e., identified by state $\bar{A}$, can be selectively reconstructed in the marker register MKR and in the match register MR by pulsing line 206 to switch cryotrons 216 and 217 resistive.

The enable register ER automatically sets the occupancy register OR because current in the EN branch switches cryotron 182 resistive unless line 188 is active. A destructive readout may be selectively made by driving current through the destructive readout line 188 to switch cryotron 186 resistive and thereby force the EN current into branch 184 to switch cryotron 189 resistive.

WRITE IN FIRST EMPTY WORD

It will customarily be desired to commence writing in the first empty word of memory and to sequentially write in the first empty word thereafter. The occupancy register OR reflects the "occupied" or "vacant" status for each word in memory. The marker register MKR is then set to the vacancy branch of the occupancy register OR by pulsing line 242. The set of words so identified in then transferred to the match register MR by pulsing line 250 with an upwardly flowing current. The serial-by-word control line 170 is energized to operate the enable ladder EL in the serial mode and the write enable line 190 is energized to operate in the write mode. The enable register is then set only to the first word identified in the match register by pulsing the set enable register line 178 and current passes through the write enable line WEN only in that one word. Current of the appropriate polarity is then passed through the bit drive line BDL in each bit position where binary informaion is to be stored. This switches the cryotrons 48 and 50 resistive so as to route the bit drive line current through branch 40 of the storage loop 36. It is important to then discontinue the current through the WEN line prior to discontinuation of the bit drive line current so that the cycling current will be trapped in the storage loop 36. Thus it is important to reset the enable ladder by pulsing line 198 to switch cryotron 200 resistive prior to deactivation of the bit drive line BDL.

When the enable register ER was set to the enable ladder EL, cryotron 207 of the action register AR was automatically switched resistive by current in line EN, thus downward current in line 206 passes through branch 205 and will result in current trapping corresponding to the A state if current in line 206 is not discontinued until after the ER reset. Thus after the write operation is completed, the sequence reset line 213 is pulsed to reset the match register MR and marker register MKR from the current in branch 205 of the action register AR. This automatically resets the enable ladder EL at the word in which the information was just written, and automatically sets the enable ladder at the next succeeding word identified by current in the match branch M of the match register MR. The write procedure is then repeated by setting the enable register ER to the enable ladder EL, driving current through the bit drive lines BDL in the proper direction, resetting the enable register ER, and resetting the match register MR and the marker register MKR from the action register AR until all words are written in. When the memory is full, current will emerge from the bottom of the enable ladder line primary 152. If additional words remain to be written, then steps must then be taken to identify a word or group of words which are to be vacated in order to make room for the additional entries. This entails a search to identify the set in the match register MR as will hereafter be described in greater detail.

SELECTIVE WRITE

Sometimes it is desirable to write the same information in the corresponding bit positions of a predetermined set of words. This is accomplished by first identifying the set of words in the match register MR. The enable ladder EL is operated in parallel-by-word mode by energizing line 168 so that current is routed back to the enable ladder primary 152 through the return branch 158 so that current will be in the crossover branch at all the words identified in the match register MR. The write enable line 190 is energized to operate in the write mode. The enable register ER is then set to the enable ladder by pulsing line 178 so that write enable current will be directed through the write enable lines WEN of all words in the set simultaneously, i.e., in parallel. The bit drive lines BDL of the corresponding bits of interest are then energized with current in the proper direction. The enable register is then reset prior to termination of current in the bit drive lines in order to trap the current in the storage loop at all of the bit positions.

MAGNITUDE SEARCHES

In order to accomplish a magnitude search, the appropriate magnitude control line is activated. For example, if an equals search is to be conducted, "equals" line 122 is energized to switch cryotrons 132 and 134 resistive. The set of words to be included in the magnitude search is identified by current flow in the MK branch of the marker register MKR of each such word. The memory is then interrogated with the mask argument information by directing current through the bit drive line BDL of each bit position which is to be taken into consideration, and only in those bit positions. This permits cryotrons 72, 74 and 76 at each bit position to assume the appropriate states of resistivity and superconductivity as heretofore described so as to route current into either the "equals," "greater than" or "less than" branches EQ, GT and LT. The match register MR is then set to the marker register MKR by pulsing control line 250 with upwardly directed current. For the example cited, a superconducting path can be established through the M branch of the match register MR only in those words where equality is established at all interrogated bit positions, since only the "equals" branch EQ possesses this potential because cryotrons 132 and 134 in the "greater than" and "less than" lines are switched resistive by current in the control line 122. Thus after the pulse in the control line 250 is terminated, the match register MR will reflect only those words which were a match for the argument at every bit position of interest. The same procedure is followed for all of the other magnitude searches, except that the appropriate magnitude search control line is energized. It will be noted that the magnitude search is accomplished parallel-by-word and parallel-by-bit so that the answer is immediately available as identified in the M branches of the match register.

BETWEEN LIMITS SEARCH

In order to accomplish a between the limits search, i.e., greater than a selected minimum and less than a selected maximum, two magnitude searches are conducted. One of the magnitude searches is a search to identify those words greater than the selected minimum value. The result of this search is reflected in the match register. Then a search for the words less than the selected maximum is conducted on the set of words identified in the first search. This latter search is conducted without the necessity of transferring the results of the first set from the match register. Of course, these between limit searches can either include or exclude the limits if the "equal to or greater than" line and the "equal to or less than" line are selected by operation of the magnitude search control lines.

OUTSIDE LIMITS SEARCH

In conducting a search outside limits, i.e., a search below a selected minimum and above a selected maximum, two magnitude searches must be conducted. The words to be searched are first identified in the marker register MKR to preserve the search field after the first search. The search set is then transferred to the match register MR and a search conducted for those words which are less than the lower value of the limits. The words which are less than the lower limit are identified in the match register MR after the search. This set of words is then transferred to the action register AR by a combination of currents applied to lines 206 and 210 which will result in counterclockwise trapped current in the action register for matched words. Then the match register MR is again set to the marker register MKR to restore the initial field of search, and a magnitude search is conducted to identify those words above the upper limit in the match register MR. The lower limit set which is identified by the $\bar{A}$ state of the action register AR and the higher limit set now defined in the match register may be combined and acted upon as desired, e.g., the $\bar{A}$ state of the action register may be set into the match register, combining the two sets. If it is desired to perform an ordered retrieval of this set, as hereafter described, then the lower limit set should be transferred from the action register to the marker register MKR *after* the marker register has been reset, and the upper limit set also transferred from the match register MR to the marker register MKR so as to preserve the identity of the search results during subsequent retrieval operations.

RECIPROCAL

The ternary action register AR also provides a means for producing the reciprocal of any magnitude search. This is accomplished by setting the action register to the $\bar{A}$ at all words identified in the original search set. Then after the search is completed, the resulting set is transferred to the A state of the action register so that the set still identified in the $\bar{A}$ state is the reciprocal of the search. This reciprocal value may also be used to advantage in the storage and manipulation of various subsets of words as will occur to skilled programmers.

EXTREMUM SEARCHES

In order to conduct an extremum search, the set of words to be searched is identified in the match register MR. The "equals" control line of the magnitude search control is energized so that only the "equals" line EQ remains as a possible superconductive path for the M branch of the match register MR. If the maximum of the words in the search set is to be found, an argument of logical "1" is asked at all bit positions of interest. Beginning at the highest order bit position, the conductive state of the sense bit match line 78 is monitored in all interrogated bit positions. Proceeding from high to low order bit positions, wherever the sense bit match line 78 is superconductive, the argument bit at that position is charged to logical "0" and the MR is set to MKR. This is repeated until all of the sense bit match line are resistive. The word or words for which the match branch M is still superconductive define the set which contains maximum values for the interrogated bit positions. A minimum search is performed by an analogous procedure in which the initial argument is logical "0" at all interrogated bit positions, and proceeding from high order to low order, the argument is changed from a logical "0" to a logical "1" at the bit positions where the sense bit match lines 78 are superconductive. The word, or words, identified in the match register MR defines the set which contains the minimum value for all interrogated bit positions.

A search to determine the word nearest above a predetermined value may be conducted using two different methods. In the first method, a magnitude search is first conducted to determine all words greater than the predetermined value. The resulting set of words is stored in the marker register MKR and a minimum search is performed on this set of words as described above. In order to determine the nearest word below a selected value using this method, a magnitude search to find all words less than the value is first performed, and the results transferred to the marker register MKR. Then a maximum search is performed on the words so identified in the marker register MKR.

In the second method, the nearest above search is conducted by making the initial search argument equal to the number next greater than the limit value and then, beginning at the lowest order bit position, changing the argument at each position where the argument is logical "0" to a logical "1" until one or more words are equal as indicated by resistance in all bit sense lines 78. The next less than search is conducted in an analogous manner except that, still beginning at the lowest order bit position, the argument is changed from logical "1" to logical "0" until all bit sense lines 78 are resistive.

RETRIEVAL—SERIAL

After a set of words has been identified, the set may be read out serially-by-word based merely upon geometrical ordering of the words in the memory, or based upon an ascending or decending ordering with respect to a parameter value stored in each word. Assume, for example, that a search has been performed and the resulting set of words is identified in the match register MR. The words in the set can be read out serially based on relative location of the words in the memory by placing the enable ladder EL in serial-by-word mode. Then the enable register ER is set to the enable ladder only at the first word of the set identified in the match register MR and the word is read out. Simultaneously, the action register is set to the A state and the enable register ER is then reset. A sequence action is obtained by resetting both the match register MR and the marker register MKR from the A state of the action register AR by the MR and MKR reset line. The word just read out is thereby deleted from the match register MR, and the enable ladder EL is automatically set to the next word of the set originally identified in the match register MR. Then the enable register ER is again set to the enable ladder EL and the preceding steps are repeated as the next word is read. When current appears at the bottom of the enable ladder primary 152, all words in the original set have been read out. This condition may also be determined by looking for a superconducting state in the bit match sense line for the last bit position of the word, indicating no further words to be read.

RETRIEVAL—ORDERED

When it is desired to read out a set of words in either an ascending or descending order with respect to some parameter stored in each word, the identity of the set is transferred to the marker register MKR after first resetting the marker register MKR. Then an ordering search is conducted, using the marker register MKR to restore the identity of the original set in the match register MR as required. Thus, assume that the words of the original set are to be retrieved on an ascending order. Either a minimum or a next greater than search can be made to find each word or set of words if ties result. If only a single word is found, a simple readout is accomplished, the action register set to the A state, and the MR and MKR reset for this word. If a set of words is identified in this manner, the words are read out serially using the serial mode of the enable ladder EL, recording completion of each word read out by appropriately setting the A state of the AR and resetting the MR and MKR for this word. After all words identified in the match register MR as a result of the first set have been read out, a condition indicated by current in the bottom of the enable ladder primary, a search for the next word or words in the set remaining in the marker register MKR is made and the word or words read out as identified until all words in the marker register have been deleted. This can be determined by either the sense marker register status line or by the presence of current in the bottom of the enable ladder primary immediately after a transfer of the set from the marker register MKR to the match register MR.

RETRIEVAL—ORDERED, SERIAL

An ordered retrieval within an ordered retrieval with a serial retrieval of ties at the second order may also be accomplished using the word control of FIGURES 3A–3B. The original set of words to be retrieved is again set in the marker register MKR, then transferred to the match register MR and an ordering search procedure instigated. After each step of the ordering search procedure, the word or words identified in the match register MR are transferred to the $\bar{A}$ state of the action register by a set action. The presence of at least one word in the match register MR can be determined by the absence of current in the primary of the enable ladder EL which is operated in serial mode. Then an ordering search based upon a second ordering criteria is conducted on the word or set of words so identified in the match register MR, this set being reestablished in the match register as required from the $\bar{A}$ state of the action register. Any word or words found after each step of the second ordering search may then be read out serially using the A state of the action register AR to sequence the marker register MKR and the match register MR. Note that setting the AR to A state for each word as it is read out deletes this word from the interim set indicated by the $\bar{A}$ state of the AR. Once the set identified in the $\bar{A}$ state of the action register (i.e., the set found by the first ordering search) has been exhausted by the second ordering search and readout procedure, the first ordering search may be resumed. After the retrieval operation has exhausted all the set originally identified in the marker register, the retrieval is completed and the identity of the original set is preserved in the A state of the action register AR.

ORDERED REPLACEMENT

In some cases when the memory is full, it will nevertheless be necessary to write words into the memory and it is necessary to establish some search criteria for determining which words are to be replaced. One convenient method may involve identification of a word or set of words by an equality search to locate occupied but expendable word locations which may be sequentially written into until all of the new words are stored. The M branch of the match register MR is the high inductance branch of the match register flip-flop, and there is always the possibility that the match register will be accidentally reset at words identified other than that being written into by the interaction of the write current in the bit drive lines BDL and the current in the storage loops. This is particularly true when the M branch of the match register MR used to interrogate the bit positions is a single line as will hereafter be described. If the "greater than" and "less than" branches GT and LT are used, this danger may be reduced but not eliminated.

Accordingly, old words may be discarded to make way for new words by identifying a set of words, such as by an equals search, and transferring this set to the marker register MKR. This set may then be replaced serially by transferring the set to the match register MR, operating the enable ladder in serial mode, performing a write operation, and using the action register A state to reset the marker register MKR to obtain sequencing. This set may also be eliminated and replaced on some ordered basis, one word at a time. This is accomplished by transferring the set to the marker register MKR and to the match register MR, conducting an ordering search, (i.e., next greater or next least, maximum or minimum), and transferring the results of the ordering search (if any ties) to the $\bar{A}$ state of action register AR. The subset of words then identified by the first ordering search may be replaced serially by resetting the marker register MKR and match register MR from the A state of the action register to obtain sequencing, and setting the match register MR from the $\bar{A}$ state of the action register after each writing action to repair any damage done to the set in the match register by interaction of the write currents and the stored currents.

If desired, the subset identified by the first ordering search and transferred to the $\bar{A}$ state of the action register AR may also be acted upon based upon a second ordering criteria, and tie words found during the second ordering search read out serially. This is accomplished by conducting the ordering search using the $\bar{A}$ state of the action register as backup to identify the word or words and the A state of the action register to obtain sequencing after write in of the word or words.

STORAGE BIT OF FIGURE 4

Another storage loop which may be used in the memory system illustrated in FIGURES 3A–3B is indicated generally by the reference numeral 280 in FIGURE 4.

The storage loop 280 is comprised of branches 282 and 284 formed at each word in the bit drive line BDL. The enable branch EN includes a cryotron 286 which is switched resistive by current in the bit drive line BDL and a relatively high inductance selective write branch SW which switches cryotron 288 in branch 282 of the storage loop resistive. Sufficient current will flow in branch SW to switch cryotron 288 only when cryotron 286 is resistive. Since current in line EN is terminated before current ceases in line BDL, no current is trapped in the loop formed by line EL and the path SW. Thus, a bipolar cycling current can be stored in the loop 280 to arbitrarily represent logical "1" in the clockwise direction and logical "0" when in the counterclockwise direction.

In order to store a logical "1," current is passed upwardly through the bit drive line BDL to switch cryotron 286 resistive and divert enable current through the selective write branch SW to switch cryotron 288 resistive and thereby deflect all current in the bit drive line to branch 284. The enable register ER is then reset to terminate current in the enable branch EN before current is terminated in the bit drive line and thereby trap the clockwise current. A logical "0" current is trapped using the same procedure with a downwardly directed current through the bit drive line. The logical state of the storage loop 280 is nondestructively read out by means of a bit sense line BS having a cryotron 290 which is switched resistive by additive currents in the branch 284 and in the enable branch EN. Thus, if a logical "1" is stored in the loop 280, the currents in the enable line EN and in branch 284 will add so that the bit sense line BS will be resistive. If a logical "0" is stored, the two currents will oppose and the bit sense line will be superconductive. Thus, it will be noted that both the write mode and read mode are accomplished using a single enable line, yet the selective write feature is retained. Further, the readout is nondestructive.

Searches are conducted using the match branch M only A cryotron 292 in M is switched resistive when current in the bit drive line BDL representative of the argument aids the stored current in branch 282. Thus if the argument matches the number stored, the currents will oppose and cryotron 292 will remain superconductive to indicate a match. If the argument and stored number are mismatched, the currents in branch 282 will add, thereby switching cryotron 292 resistive to indicate a mismatch.

An "equals" search is conducted on a system using the storage loop 280 on a parallel-by-bit basis merely by applying the argument in the form of currents in the bit drive line BDL of the proper polarity. If the logical number stored at the respective bit positions of interest match the logic numbers asked at all of these bit positions, then the match branch M remains superconductive. If any one of the bit positions is a mismatch for the argument, then the branch M is resistive.

A "greater than" or "less than" magnitude search must be conducted using a serial-by-bit procedure and a variable argument. A "greater than" search is conducted by first establishing the search set in the marker register MKR. The first argument is the original number specified, but modified such that the logical "0" at the lowest order bit position has been replaced by a logical "1" and the remaining lower order bit positions masked (not interrogated). The numbers matching the argument are then recorded in the match register MR following an equals search and are transferred to the $\bar{A}$ state of the action register AR. The modified argument is then changed by changing the next higher order bit position at which it is "0" to a "1" and masking all lower order bit positions. The MR is set to MKR and an equals search conducted. The words matching this argument are then accumulated in the $\bar{A}$ state of the action register AR. This procedure is repeated until all logical "0" have been replaced by logical "1." The resulting collection of words in the $\bar{A}$ state of the action register are then those words which are "greater than" the argument. The same procedure is repeated for a "less than" search except that the logical "1" bit positions of the original argument are successively changed to a "0" from the lower order bit positions to the higher order bit positions.

STORAGE BIT OF FIGURE 5

Referring now to FIGURE 5, another simplified storage bit which can be used in the data processing system illustrated in FIGURES 3A–3B is indicated generally by the reference numeral 300. The storage bit 300 is comprised of branches 302 and 304 formed in the bit drive line BDL at each word in memory. The write enable line WEN extending through the word has a high inductance selective write branch SW at each word position. A cryotron 308 in the write enable line WEN is switched resistive by current in the bit drive line BDL, and a cryotron 310 in branch 302 of the bit storage loop is switched resistive by current in the selective write branch SW as heretofore described. The read enable line REN extending through the word controls a cryotron 312 in the branch 302 of the storage loop. The match branch M of the match register of the word includes a cryotron 314 which is switched resistive by current in the branch 302 only when the current stored in the loop and the current from the bit drive line BDL passing through branch 302 add. Either current acting alone, or when acting in opposition, does not switch cryotron 314 resistive. The write enable branch WEN, the selective write branch SW, the read enable branch REN and the match branch M are the branches designated by the corresponding reference characters in FIGURES 3A–3B.

Information is written into the storage bit 300 in the same manner heretofore described in connection with the storage loops 36. Current is applied to the bit drive line BDL in a polarity corresponding to the number to be stored. Thus if a logical "1" is to be stored, current is directed upwardly through the bit drive line to switch cryotron 308 resistive thereby shunting the write enable current into the selective write branch SW to switch cryotron 310 resistive. This diverts all current in the bit drive line BDL into branch 304 of the storage loop. The write enable current is then terminated by resetting the enable register ER, and after cryotron 310 has switched superconductive, current in the bit drive line BDL is terminated resulting in current being trapped in the storage loop in the clockwise direction to represent a logical "1." Current is trapped in the counterclockwise direction to represent a logical "0" by passing a current downwardly through the bit drive line and following the same procedure.

The logical number stored in the loop 300 is read out by pulsing the read enable line REN and observing a voltage pulse on the bit drive line BDL resulting when the energy stored in the loop is dissipated in cryotron 312. The polarity of the voltage so observed indicates the logical number stored. This, of course, results in a destructive readout of the stored information. However, the results of the readout can be used to immediately restore the same information in the word.

The storage loop 300 also illustrates the use of a single match line M rather than the three branches of "equals," "greater than" and "les sthan" illustrated in connection with the storage loops 36 of FIGURE 3A. As a result, magnitude searches must be conducted on a serial-by-bit basis as discussed in connection with FIGURE 4, rather than on a parallel-by-bit basis as discussed in connection with the operation of the system of FIGURES 3A–3B.

Operation of the match branch M is the same as described in connection with FIGURE 4. If the argument expressed in the bit drive line BDL is opposed to the current stored in the loop 300 as it flows through the branch 302, cryotron 314 remains superconductive. For example, if a logical "1" is stored as a current in the counterclockwise direction, and a logical "1" is asked by a current directed upwardly, the two currents will oppose in the branch 302 and cryotron 314 will remain superconductive. However, if the argument and stored logic numbers are mismatches, then the currents add to switch cryotron 314 resistive and thereby make the match branch M resistive to indicate a mismatch in the match register as heretofore described.

An alternative form of register is illustrated schematically in FIGURE 6 and is indicated generally by the reference numeral 320. As illustrated, the register 320 is shown as a substitute for the occupancy register OR of the word control circuit of FIGURES 3A–3B, and associated circuitry is designated with the same reference characters as in FIGURES 3A–3B. The occupancy register 320 is comprised of an occupancy register drive line 322 which is divided into branches 324 and 326 at each word position to form a superconductive storage loop. As used herein, current stored in the clockwise direction in the storage loop will indicate that the word associated with the loop formed by branches 324 and 326 is "vacant," and current in the counterclockwise direction will indicate that the word is "occupied." In order to initially set the register to vacant status, current is driven downwardly through the drive line 322 and the reset line 332 is pulsed to switch cryotron 334 resistive and divert all the current to branch 326. After the reset line pulse terminates, the drive line current is terminated so that current will be trapped in the clockwise direction.

The enable branch EN of the enable register ER switches a cryotron 328 in branch 324 resistive so that current from the drive line 322 will all be directed through branch 326. Thus if a current is directed downwardly through the drive line 322, a cycling current will be stored in the clockwise direction in the loop formed by branches 324 and 326, provided the current through the enable branch EN is terminated prior to termination of current through the drive line 322, for the reason described generally in connection with the storage loops at the bit positions. Conversely, if current is directed upwardly through drive line 322, current will be stored in the counterclockwise direction when the current in the enable branch and drive line are terminated in that order. When taking action by current in the enable branch EN, upwardly directed current should be supplied in the drive line 322 before the enable register is reset if the identification of the word as "occupied" is to be retained. However, a destructive readout can be obtained by directing a current downward through the drive line 322 so that in those words where the enable line EN is active, a "vacant" status will be stored when the enable register is reset and the drive line 322 is subsequently deactivated.

The marker register MKR is set to either the "occupied" or "vacant" status of the occupancy register 320 by means of a cryotron 330 in the $\overline{MK}$ branch. Cryotron 330 is switched resistive only when the stored current in the branch 324 and the current through the drive line 322 add. Thus if the marker register MKR is to be set to the "occupied" status of the occupancy register 320, cycling current in the counterclockwise direction has previously been stored in those loops where the marker register is to be set to MK. Thus a downwardly directed current through the drive line 322 will result in the addition of current in the branch 324 to switch cryotron 330 resistive and thereby switch current from the not marker branch $\overline{MK}$ to the marker branch MK. In those words where current is in the clockwise direction indicating that the words are "vacant," the cycling current and the current from the drive line 322 will be opposed in branch 324 so that the cyrotron 330 will remain superconductive and will have no effect upon the marker register MKR. The memory can be cleared by resetting all occupancy registers to the "vacant" status by pulsing clear memory control line 332 to switch cryotron 334 in branch 324 resistive, or all occupancy registers can be set to "occupied" if for any reason it is desired to do so. This is accomplished by either an upwardly or downwardly directed current in the drive line 322 which is diverted into branch 326 by cryotron 334. It will be noted that the occupancy register 320 provides a greater degree of flexibility together with a ternary storage state if desired, yet has fewer control lines and fewer cryotrons than the occupancy register OR of FIGURES 3A and 3B. It is to be understood that the general type of register shown in FIGURE 6 may be substituted for any of the registers illustrated in FIGURES 3A–3B as desired, even though such a register has been illustrated only for use as the occupancy register.

From the above descripiton of various embodiments of the invention, it will be noted that a fully associative data processing system has been described which is highly flexible and provides the programmer with a tool useful for a large number of data processing procedures. Although the invention has been described in connection with cryogenic circuits, and various specific aspects of the invention are particularly related to such cryogenic circuits, it is to be understood that the broader aspects of the invention pertain to associative data processing systems in general. Accordingly, although various embodiments of the invention have been described in detail, it is to be understood that various changes, substitutions and alterations can be made in the various components and combinations without departing from the spirit and scope of the invention as defined by the appended claims.

What is claimed is:

1. In an associative memory system, the combination of:

a plurality of memory registers each comprised of a corresponding number of binary memory cells each for storing a binary logic number, each memory cell including means for selectively comparing the logic number stored at each memory cell to a logic number asked, a match register comprised of a binary indicator means for each memory word, each binary indicator means having a match status and a not match status, the match status being responsive to the relationship between the logic numbers stored in the memory bits of the word and the logic numbers asked, and being shifted back to the not match status when a predetermined mismatch between the logic numbers stored and the logic numbers asked occurs, an enable register comprised of a binary indicator means for each memory word and having an enable status and a not enable status, the enable status being coupled to the memory bits of the corresponding word for enabling the memory bits for action, means coupled to the match register and the enable register for selectively setting the enable register to the enable status only at the first word identified by the match status of the match register, and means for selectively resetting the match register from the match status to the not match status at those words identified by the enable status of the enable register.

2. The combination defined in claim 1 wherein the means for selectively resetting the match register comprises:

an action register comprised of a binary indicator means for each word having an action status and a not action status, means coupled to the action register and the enable register for selectively setting the action register to the action status at each word where the enable register is set to the enable status, and means coupled ot the action register and the match register for selectively resetting the match register to the not match status at each word where the action register is in the action status.

3. In an associative memory system, the combination of:

a plurality of memory registers each comprised of a corresponding number of binary memory cells each for storing a binary logic number, each memory cell including means for selectively comparing the logic numbers stored at each memory cell to a logic number asked, a match register comprised of a binary indicator means for each memory word, each binary indicator means having a match and a not match status, the match status being responsive to the relationship between the logic numbers stored and the memory bits of the word and the logic numbers asked, and being shifted back to the not match status when a predetermined mismatch between the logic numbers stored and the logic numbers asked occurs, an enable register comprised of a binary indicator means for each memory word having an enable status and a not enable statue, the enable status being coupled to the memory bits of the corresponding word for enabling the memory bit for action, means coupled to the match register and the enable register for selectively setting the enable register to the enable status which comprises an enable ladder means having a serial mode of operation and a parallel mode of operation, the parallel mode of operation resulting in the automatic setting of the enable ladder means to all words identified by the match status of the match register, and the serial mode of operation resulting in the automatic setting of the enable ladder means only to the first word identified by the match status of the match register, the enable register being selectively set to the enable status at the words where the enable ladder means is set.

4. In an associative memory system, the combination of:

a plurality of memory registers each comprised of a corresponding number of binary memory cells each for storing a binary logic number, each memory cell including means for selectively comparing the logic number stored at each memory cell to a logic number asked, a match register comprised of a binary indicator means for each memory word, each binary indicator means having a match status and a not match status, the match status being responsive to the relationship between the logic numbers stored in the memory bits of the word and the logic numbers asked, and being shifted back to the not match status when a predetermined mismatch between the logic numbers stored and the logic numbers asked occurs, an enable register comprised of a binary indicator means for each memory word having an enable status and a not enable status, the enable status being coupled to the memory bits of the corresponding word for enabling the memory bits for action, means coupled to the match register and the enable register for selectively setting the enable register to the enable status at the words identified by the match status of the match register, an occupancy register comprised of a binary indicator means for each word having an occupied status and a vacant status, means coupled to the match register and to the occupancy register for selectively setting the match register to the match status at each word identified by the occupied status of the occupancy register, and means coupled to the match register and the occupancy register for selectively setting the match register to the match status at each word identified by the vacant status of the occupancy register.

5. In an associative memory system, the combination of:

a plurality of memory registers each comprised of a corresponding number of binary memory cells each for storing a binary logic number, each memory cell including means for selectively comparing the logic numbers stored at each memory cell to the logic number asked, a match register comprised of a binary indicator means for each of the memory words, each binary indicator means having a match status and a not match status, the match status being responsive to the relationship between the logic numbers stored and the memory bits of the word and the logic numbers asked, and being shifted back to the not match status when a predetermined mismatch between the logic numbers stored and the logic numbers asked occurs, an enable register comprised of a binary indicator means for each memory word having an enable status and not enable status, the enable status being coupled to a memory bit of a corresponding word for enabling the memory bit for action, means coupled to the match register and the enable register for selectively setting the enable register to the enable status at the words identified by the match status of the match register, a marker register comprised of a binary indicator means for each word having a marked status and a not marked status, and means coupled to the marked register and the match register for selectively setting the match register to the match status at each word identified by the marked status of the marker register and for selectively set the marker register to the marked status at each word identified by the match status of the match register.

6. The combination defined in claim 5 further characterized by:

an action register having a ternary indicator means at each word with a zero status, a not action status and an action status, means intercoupling the action register and the match register for selectively setting the action register to the not action status at each word indentified by the match status of the match register, means intercoupling the action register and the match register for selectively setting the match register to the match status at each word identified by the not action status of the action register, means intercoupling the action register and the match register for setting the match register to the match status at each word identified by the action status of the action register, means intercoupling the enable register and the action register for selectively setting the action register to the action status at each word identified by the enable status of the enable register, and means intercoupling the action register, the marker register and the match register for selectively resetting the marker register and match register to the not mark and not match status at each word identified by the action status of the action register.

7. The combination defined in claim 5 further characterized by:

an action register having a ternary indicator means at each word with a zero status, not action status and an action status, means intercoupling the action register and the match register for selectively setting the action register alternatively to the not action status or to the action status at each word identified by the match status of the match register, means intercoupling the action register and the match register for selectively setting the match register to the match status at each word identified by, alternatively, the not action status or the action status of the action register, means intercoupling the enable register and the action register for selectively setting the action register to, alternatively, the action status or the not action status as each word identified by the enable status of the enable register, and means intercoupling the action register, the marker register and the match register for selectively resetting the marker register and the match register to the not mark and not match status at each word identified by, alternatively, the not action status or the action status of the action register.

8. In an associative memory system, the combination of:

a plurality of memory registers each comprised of a corresponding number of binary memory cells each for storing a binary logic number, each memory cell including means for selectively comparing the logic number stored at each memory cell to a logic number asked, a match register comprised of a binary indicator means for each memory word, each binary indicator means having a match status and a not match status, the match status being responsive to the relationship between the logic numbers stored in the memory bits of the word and the logic numbers asked, and being shifted back to the not match status when a predetermined mismatch between the logic numbers stored and the logic numbers asked occurs, an enable register comprised of a binary indicator means for each memory word having an enable status and a not enable status, the enable status being coupled to the memory bits of the corresponding word for enabling the memory bits for action, means coupled to the match register the enable register for selectively setting the enable register to the enable status at the words identified by the match status of the match register, an occupancy register comprised of a binary indicator means for each word having an occupied status and a vacant status, a marker register comprised of a binary indicator means for each word having a mark status and a not mark status, means intercoupling the occupancy register and the marker register for selectively setting the marker register to the mark status at each word identified by the occupied status of the occupancy register, means intercoupling the occupancy register and the marker register for selectively setting the marker register to the mark status in each word identified by the vacant status of the occupancy register, and means intercoupling the marker register and the match register for selectively setting the match register to the match status at each word identified by the mark status of the marker register and for selectively setting the marker register to the mark status at each word identified by the match status of the match register.

9. The combination defined in claim 8 further characterized by:

means coupled to the match register for selectively resetting the match register to the not match status at each word, means coupled to the enable register for selectively resetting the enable register to the not enable status at each word, means coupled to the marker register for selectively resetting the marker register to the not mark status at each word, and means coupled to the occupancy register for selectively resetting the occupancy register to the vacant status at each word.

10. The combination defined in claim 8 further characterized by:

an action register comprised of a binary indicator means for each word having an action status and a not action status, means intercoupling the enable register and the action register for selectively setting the action register to the action status at each word identified by the enable status of the enable register, means intercoupling the action register, the marker register and the match register for selectively resetting the marker register and the match register to the not mark and not match statuses, respectively, at each word identified by the action status of the action register, and means coupled to the action register for selectively setting the match register to the match status at each word identified by the action status of the action register.

11. The combination defined in claim 10 wherein the means for selectively setting the enable register comprises:

an enable ladder register having a parallel mode of operation wherein the enable ladder means is automatically set to all words identified by the match status of the match register, and a serial mode of operation wherein the enable ladder register is automatically set only to the first word identified by the match status of the match register, the enable register being selectively set to the enable status from the enable ladder register.

12. In a cryogenic memory system, the combination of:

a storage loop formed by first and second branches in a bit drive line, an enable line extending through the storage loop position having a first cryotron therein switched resistive by current in the bit drive line, a second cryotron in one branch of the storage loop, and a selective write branch connected in shunt around the first cryotron for switching the second cryotron resistive only when the first cryotron is switched resistive and all current passing through the enable line is diverted through the selective write branch.

13. The combination of claim 12 further characterized by:

a sense line extending through the storage loop position having a dual control cryotron therein, the dual control cryotron being coupled to the storage loop and the enable line and being switched resistive only by the addition of current stored in the storage loop and current through the enable line, whereby when a unipolar current passed through the enable line and the cycling current stored in the loop is in one direction, the dual control cryotron will be resistive, and when the unipolar current and the cycling current are in opposite directions, the dual control cryotron will be superconductive.

14. In a cryogenic data processing system having a plurality of memory words, the combination of:

a first register comprised of a storage loop formed at each word position by first and second branches in a first register drive line, first register drive means connected to the first register drive line for selectively driving dipolar current through the drive line, a first register reset control line extending through all word positions in memory, a first cryotron in one branch of each storage loop, said first cryotron being switched resistive by current in the first register reset control line, a second register comprised of a second register drive line extending through all words in memory and divided into first and second branches at each word position, a second register drive means connected to the second register drive line for driving a current through the second register drive line, a second cryotron in each first branch of the second register switched resistive by current in the first branch of the first register only when the cycling current stored in the storage loop and the current from the second register drive line add in the first branch, a third cryotron in each first branch of the first register, a transfer control line extending through all word positions in memory and extending generally parallel to a portion of each second branch of the second register, the parallel portions of the transfer control line and the second branch of the second register controlling the third cryotron to switch the third cryotron resistive when current in the transfer control line and in the second branch of the second register are in the same direction and not otherwise.

15. The combination defined in claim 14 further characterized by:

a fourth cryotron in each second branch of the second register, and a reset transfer line extending through all words in memory and extending parallel to a portion of each second branch of the first register, the reset control line of the parallel portion of the second branch controlling the correspondinug fourth cryotron, the fourth cryotron being switched resistive only when current in the reset control line and in the second branch are in the same direction.

16. In a cryogenic memory system, the combination of:

a plurality of bit drive lines extending in parallel through each of a plurality of memory word positions, each bit drive line having first and second branches formed at each word position to form a bit storage loop, enable means extending through all bit positions of each word and coupled to each bit position of the word for enabling the bit position for write and read functions, interrogation means including a match line extending from the highest order bit position to the lowest order bit position of each word and coupled to each storage loop for comparing the logic number stored in the loop and a logic number asked, a match register comprised of a match register drive line extending through all words in memory and divided into a "match" branch and a "not match" branch at each word, the "match" branch including the match line of the interrogation means, an enable register comprised of an enable register drive line extending through all words in memory and divided into an "enable" branch and a "not enable" branch, the "enable" branch including the enable line extending through all bit positions of the corresponding word, means intercoupling the match register and the enable register for selectively setting the enable register to the "enable" branch at the first word in memory identified by current in the "match" branch of the match register, sequence reset means intercoupling the enable register and the match register for selectively resetting the match register from the "match" branch to the "not match" branch at all words identified by current in the "enable" branch of the enable register, a marker register comprised of a marker drive line extending through all words in memory and divided into a "mark" branch and a "not mark" branch at each word, and first transfer means intercoupling the marker register and the match register for selectively setting the match register to the "match" branch at each word identified by current in the "mark" branch of the marker register.

17. The combination defined in claim 16 wherein the sequence reset means for selectively resetting the match register comprises:

an action register comprised of an action register drive line extending through all words in memory having an "action" status and a "not action" status at each word position, second transfer means intercoupling the enable register and the action register for setting the action register to the "action" status at each word identified by current in the "enable" branch of the enable register, and reset means intercoupling the action register and the match register for selectively resetting the match register to the "not match" branch at each word identified by the "action" status of the action register.

18. The combination defined in claim 17 wherein:

the action register is comprised of a storage loop formed at each word position in an action register drive line extending through all words in memory, and means for selectively storing a bipolar cycling in the storage loop at each word to provide three logical states of "zero," "not action" and "action," and further characterized by third transfer means intercoupling the match register and the action register for selectively setting the action register tot he "not action" satus at each word position identified by current in the "match" branch of the match register and for selectively setting the match register to the "match" branch at each word identified by the "not action" status of the action register.

19. In a cryogenic memory system, the combination of:

a plurality of bit drive lines extending in parallel through each of plurality of memory word positions, each bit drive line having first and second branches formed at each word position to form a bit storage loop, bit drive means connected to each bit drive line for selectively driving a bipolar current through each bit drive line, a first cryotron in one branch of each bit storage loop for switching the branch resistive, an enable line extending through all bit positions of each word and coupled to the first cryotron for selectively switching the first cryotron resistive, whereby a bipolar cycling current may be stored in the loop to represent a binary logic number by switching the first cryotron resistive, driving current through the bit drive line having a selected polarity, switching the first cryotron superconductive, and then terminating the current through the bit drive line, a second cryotron in the enable line at each bit position switched resistive by current through the bit drive line, and a selective write branch connected in shunt around the second cryotron having a relatively high inductance as compared to the parallel portion of the enable line, the selective write branch being coupled to switch the first cryotron resistive, whereby only the bit storage loop at which current is presented in the bit drive lines will be enabled.

20. In a cryogenic memory system, the combination of:

a plurality of bit drive lines extending in parallel through each of a plurality of memory word positions, each bit drive line having first and second branches formed at each word position to form a bit storage loop, bit drive means connected to each bit drive line for driving a bipolar current through each bit drive line, a first cryotron in one branch of each bit storage loop for switching the branch resistive, a write enable line extending through all bit positions of each word and coupled to the first cryotron for selectively switching the first cryotron resistive to permit a bipolar cycling current to be stored in the bit storage loop, a bit sense line extending through all bit positions associated with each bit drive line having a second cryotron therein at each bit position that is partially controlled by current in the storage loop, a read enable line extending through all bit positions of each word and partially controlling the second cryotron at each bit position of the word, the second cryotron being switch resistive by current in the read enable line and in the storage loop only when the currents add, and remaining superconductive otherwise, interrogation means extending from the highest order bit position to the lowest order bit position of each word, the interrogation means comprising an "equals" line extending through all bit positions of each word and divided into first and second control branches at each bit position which extend in opposite directions relative to the first branch of the storage loop, a "less than" branch and a "greater than" branch extending from the "equals" line at each bit position, the "less than" branches of all bit positions of each word being joined and the "greater than" branches of all bit positions of each word being joined, a third cryotron in the "equals" line at each bit position, the third cryotron being switched resistive by current in the second branch of the storage loop when the stored current and the current from the bit drive line add in the second branch, and remaining superconductive when the currents oppose, a fourth cryotron in the "less than" branch at each bit position, the fourth cryotron being switched resistive when the current in the first control branch and the current in the first branch of the storage loop resulting from current in the bit drive line oppose, being switched resistive when the current in the first control branch and the current in the first branch of the storage loop from the bit drive line and the current stored in the storage loop add, and being switched superconductive only when the currents in the first control branch and the current in the first branch of the storage loop from the bit drive line add and collectively oppose the current stored in the storage loop, a fifth cryotron in the "greater than" branch at each bit position, the fifth cryotron being switched resistive when the current in the second control branch and the current in the first branch of the storage loop resulting from current in the bit drive line oppose, being switched resistive when the current in the second control branch and the current in the first branch of the storage loop from the bit drive line and the current stored in the storage loop add, and being switched superconductive only when the current in the second control branch and the current in the first branch of the storage loop from the bit drive line add and collectively oppose the current stored in the storage loop, whereby only one of the third, fourth and fifth cryotrons will be superconductive at any one time, a match register comprised of a match register drive line extending through all words in memory and divided into a "match" branch and a "not match" branch at each word, the "match" branch including the "equals" line and the "less than" and "greater than" branches in parallel, magnitude search control means extending through all word positions in memory for making preselected combinations of the "equals" line, "less than" branch and "greater than" branch resistive at points between the lowest order bit position and the match register drive line extending to the next successive word in memory, match register reset means extending through all words in memory and coupled to the match register for selectively making the "match" branch at each word resistive to divert current from the match register drive line into the "not match" branch, an enable register comprised of an enable register drive line extending through all words in memory and divided into an "enable" branch and a "not enable" branch, the "enable" branch including, in parallel, the write enable line and the read enable line for the word, enable mode control means extending through all words in memory for selectively making, in the alternative, either the read enable line or the write enable line resistive whereby current in the "enable" branch will be directed through either the write enable line or the read enable line, respectively, enable register reset means extending through all words in memory and coupled to each "enable" branch for switching the "enable" branch resistive and directing current from the enable register drive line through the "not enable" branch, an enable ladder comprising a primary conductor and a secondary conductor extending in parallel through all words in memory, a crossover branch interconnecting the primary conductor and the secondary conductor at each word position, a sixth cryotron in the primary conductor at each word position switched resistive by current in the "match" branch of the match register, a seventh cryotron in each crossover branch switched resistive by current in the "not match" branch of the match register, a return branch interconnecting a midpoint of the crossover branch between the seventh cryotron and the secondary conductor and the primary conductor at a point below the sixth cryotron, mode control means including an eighth cryotron in the return branch and a ninth cryotron in the crossover branch between said midpoint and the secondary conductor, and control means extending through all words in memory for switching the eighth and ninth cryotrons resistive, alternatively, such that current through the crossover branch will be directed in the alternative either back to the primary conductor or to the secondary conductor, and a tenth cryotron in the "not enable" branch of the enable register partially controlled by current in the crossover branch between the primary conductor and said midpoint of the crossover branch, enable register set means extending through all words in memory for, in combination with current through the crossover branch, switching the tenth cryotron resistive to divert current from the "not enable" branch to the "enable" branch of the enable register, a marker register comprising a marker register drive line extending through all words in memory and having a "mark" branch and a "not mark" branch formed at each word position, marker register reset means extending through all words in memory for selectively switching the "mark" branch at each word position resistive to divert current from the marker register drive line through the "not mark" branch, transfer means extending through all words for selectively, at each word identified by current in the "mark" branch of the marker register, switching the "not match" branch of the match register resistive to divert current from the match register drive line through the "match" branch and for selectively, at those words identified by current in the "match" branch of the match register, switching the "not mark" branch of the marker register resistive to divert current from the marker register drive line through the "mark" branch, an action register comprised of an action register drive line extending through all words in memory and having an "action" branch and a "not action" branch forming a storage loop at each word position, an action register drive means connected to the action register drive line for selectively driving bipolar current through the action register drive line, action register reset means including an eleventh cryotron in one branch of the action register at each word position and control line means extending through all words in memory for selectively switching the eleventh cryotron resistive, a twelfth cryotron at each word position in one branch of the action register switched resistive by current in the "enable" branch of the enable register at that word position, action register-match register transfer means including a thirteenth cryotron in each "match" branch of the match register which is switched resistive by the addition of current stored in the corresponding storage loop of the action register and the current through one branch of the action register from the action register drive line to divert current from the "not match" branch to the "match" branch of the match register, action register-marker register transfer means comprised of a fourteenth cryotron in the "not mark" branch at each word position of the marker register which is switched resistive by the addition of current stored in the storage loop of the action register at that word position and the current from the action register drive line in one branch of the action register, a transfer control line extending through all words in memory and a drive means connected to the line for driving a bipolar current therethrough, match register-action register transfer means comprising a fifteenth cryotron in one branch of the action register at each word position, the fifteenth cryotron being switched resistive by the addition of current in the "match" branch of the match register and the current in the transfer control line, marker register-action register transfer means comprising a sixteenth cryotron in one branch of the action register at each word positon which is switched resistive by the addition of current in the "mark" branch of the marker register and current in the transfer control line, a sequence reset control line extending through all words in memory and drive means connected to drive bipolar current through the control line, action register-match register sequence reset means comprising a seventeenth cryotron in the "match" branch of the match register which is switched resistive by the addition of current in the sequence reset control line and current in one branch of the action register at that word position, action register-marker register sequence reset means comprising an eighteenth cryotron in the "mark" branch of the marker register which is switched resistive by the addition of current through the sequence reset means and current in one branch of the action register at that word position, an occupancy register comprising an occupancy register drive line extending through all words in memory and having an "occupied" branch and a "vacant" branch formed at each word position, occupancy register reset means including a reset control line extending through all words in memory and a nineteenth cryotron in the "occupied" branch at each word position switched resistive by current in the control means to divert current from the occupancy register drive line through the "vacant" branch, occupancy register-marker register "occupied" transfer means comprising a control line extending through all words in memory and a twentieth cryotron in each "not mark" branch of the marker register switched resistive by the addition of current in the control line and current in the "occupied" branch of the occupancy register to divert current from the marker register drive line to the "mark" branch, occupancy register-marker register "vacant" transfer means comprising a control line extending through all words in memory and a twenty-first cryotron in each "not mark" branch of the marker register switched resistive by the addition of current in the control line and in the "vacant" branch of the occupancy register to divert current from the marker register drive line to the "mark" branch, enable register-occupancy register set means comprising a twenty-second cryotron in the "vacant" branch at each word position of the occupancy register which is switched resistive by current in the "enable" branch of the enable register to divert current from the occupancy register drive line through the "occupied" branch of the occupancy register, and destructive readout means comprised of a twenty-third cryotron in the "occupied" branch at each word position of the occupancy register, a high inductance branch in the "enable" branch of the enable register controlling the twenty-third cryotron, and means for selectively diverting current from the "enable" branch through the high inductance branch to switch the twenty-third cryotron resistive and reset the occupancy register.

References Cited

UNITED STATES PATENTS

| | | | |
|---|---|---|---|
| 3,253,265 | 5/1966 | Lindquist | 340—173.1 |
| 3,235,839 | 2/1966 | Rosenberg | 340—173.1 |
| 3,221,158 | 11/1965 | Roth et al. | 340—172.5 |
| 3,196,407 | 7/1965 | Davies | 340—172.5 |
| 3,195,109 | 7/1965 | Behnke | 340—172.5 |
| 3,191,156 | 6/1965 | Roth | 340—172.5 |
| 3,184,717 | 5/1965 | Behnke | 340—172.5 |

ROBERT C. BAILEY, *Primary Examiner.*

G. SHAW, *Assistant Examiner.*